US006480717B1

(12) United States Patent
Ramaswamy

(10) Patent No.: US 6,480,717 B1
(45) Date of Patent: Nov. 12, 2002

(54) TUNNELING OF NON-GSM SIGNALING MESSAGES IN A GSM BASED NETWORK TO ENABLE BOTH NON-GSM CIRCUIT SERVICE AND GSM PACKET SERVICE TO THE MOBILE STATION

(75) Inventor: Satyanarayanan Ramaswamy, Wheeling, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/407,557

(22) Filed: Sep. 28, 1999

(51) Int. Cl.[7] .................................................. H04Q 7/20
(52) U.S. Cl. ........................ 455/445; 455/417; 455/466; 370/352
(58) Field of Search ............................. 455/426, 432, 455/433, 466, 445, 417; 370/352, 356, 353, 354, 338

(56) References Cited

U.S. PATENT DOCUMENTS

| | | | | |
|---|---|---|---|---|
| 6,061,346 A | * | 5/2000 | Nordman ..................... | 370/352 |
| 6,104,929 A | * | 8/2000 | Josse et al. .................. | 455/445 |
| 6,122,293 A | * | 9/2000 | Frodigh et al. .............. | 370/473 |
| 6,167,279 A | * | 12/2000 | Chang et al. ................ | 455/462 |
| 6,201,974 B1 | * | 3/2001 | Lietsalmi et al. ........... | 455/466 |
| 6,243,579 B1 | * | 6/2001 | Kari ............................. | 455/426 |
| 6,320,873 B1 | * | 11/2001 | Nevo et al. .................. | 370/466 |
| 6,327,256 B1 | * | 12/2001 | Paivike et al. .............. | 370/337 |
| 6,415,151 B1 | * | 7/2002 | Kreppel ....................... | 455/445 |

OTHER PUBLICATIONS

Satya Ramaswamy, "Gs' Interface Stage 3 text", Sep. 29, 1998, 21 pages.
Satya Ramaswamy, "Signaling Techniques and Stage 2 Procedures for 136+/GPRS", Aug. 31, 1998, 19 pages.

* cited by examiner

*Primary Examiner*—Lester G. Kincaid
*Assistant Examiner*—Tilahun Gesesse
(74) *Attorney, Agent, or Firm*—Michael C. Soldner; Lawrence J. Chapa

(57) ABSTRACT

A non-GSM network that uses a GSM serving GPRS support node (40) and a gateway support node for providing packet service to transmit a message capsule (52) containing one or more signaling messages between a mobile station (36) and a mobile switching center (46). The mobile station (36) constructs an uplink tunneling of messages protocol envelope (48) that includes, in addition to a uplink message capsule, information specific to non-GSM protocols and the serving GPRS support node (40) determines a destination of the uplink message capsule based on a routing area identifier and the information specific to the non-GSM protocols. The serving GPRS support node (40) constructs a downlink tunneling of messages protocol envelope that includes a downlink message capsule and information specific to the non-GSM protocols and transmits the downlink tunneling of messages to the mobile station (36) and the mobile station extracts the downlink message capsule based on the information specific to the non-GSM protocols.

24 Claims, 2 Drawing Sheets

TUNNELING OF NON-GSM SIGNALING MESSAGES IN A GSM BASED NETWORK TO ENABLE BOTH NON-GSM CIRCUIT SERVICE AND GSM PACKET SERVICE TO THE MOBILE STATION

FIELD OF THE INVENTION

The present invention relates generally to digital cellular communication, and more particularly to non-GSM signaling in a general packet service based GSM network.

BACKGROUND OF THE INVENTION

A General Packet Radio Service ("GPRS") is a packet data service used by Global System for Mobile Communication ("GSM") networks to enable the GSM networks to send and receive data in an end-to-end packet transfer mode. As a result, network architecture used in a GSM network to support packet data service includes two pure packet network nodes. These pure packet network nodes include a Serving GPRS Support Node ("SGSN") that is used to perform signaling operations, along with a Gateway GPRS Support Node ("GGSN") used to interface with an internet protocol ("IP") network. The SGSN can also be connected to other SGSNs belonging to other service providers, which in turn can also be connected to other SGSNs, and so forth.

FIG. 1 is a schematic diagram of a packet data service based GSM network. As illustrated in FIG. 1, in addition to a SGSN 22 and a GGSN 24, a GPRS based GSM network 20 generally includes a mobile station 26 interconnected with a base station 28 that in turn interfaces with the SGSN 22, a mobile switching center ("MSC") 30, and a home location register ("HLR") 32 associated with the mobile switching center 30 that is used to authenticate service.

The base station 28 receives a message sent by the mobile station 26 and the message is transmitted from the base station 28 to the SGSN 22. The SGSN 22 terminates the message, processes information associated with the message to generate new signaling, and transmits the new signaling to the mobile switching center 30. In the same way, a message to be sent by the mobile switching center 30 to the mobile station 26 is transmitted from the mobile switching center 30 to the SGSN 22. The SGSN 22 terminates the message, processes information associated with the message to generate new signaling, and transmits the new signaling to the mobile station 26 through the base station 28.

In a network system in which both the mobile switching center 30 and the SGSN 22 operate using GSM based technology, this process of terminating the message and processing information to generate new signaling that is performed by the SGSN 22 involves processing of information using a single technology, namely GSM technology. As a result, the termination of the message and the generation of new signaling by the SGSN 22 can be accomplished without requiring significant modification to the SGSN 22.

However, operation of different, non-GSM related technologies within the framework of the GPRS based GSM network elements, i.e., the SGSN 22 and the GGSN 24, requires that technologies different from the GSM technology be included in the GSM network 20. For example, when the mobile switching center 30 is designed to operate within the framework of a non-GSM network, the mobile switching center 30 utilizes technologies other than GSM technologies, and therefore the mobile switching center 30 must operate using a technology substantially different from that of the SGSN 22 in order to provide packet services to the mobile station 26. Since the mobile station 26 can only be reached through the SGSN 22, the SGSN 22 would be required to process information using both GSM and the non-GSM technology. As a result, connecting the non-GSM mobile switching center with the SGSN 22 becomes more complicated and requires significant modifications of the SGSN 22 and the non-GSM mobile switching center, limiting the extent of signaling and non-signaling messages that can be exchanged between the mobile station 26 and the non-GSM mobile switching center.

Therefore, what is needed is a procedure that minimizes necessary changes to the SGSN 22 and the non-GSM mobile switching center, while enabling deployment of a wide variety of signaling and non-signaling message exchanges between the mobile station 26 and the mobile switching center 30, that has minimal effects upon the operation of the SGSN 22.

DETAILED DESCRIPTION OF THE PREFERRED EMBODIMENTS

Figure 1:
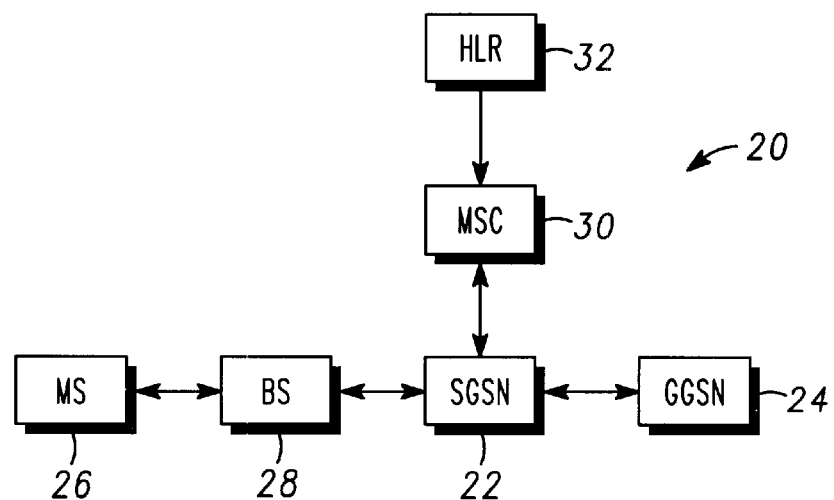
FIG. 1 is a schematic diagram of a packet data service based GSM network.
Figure 2:
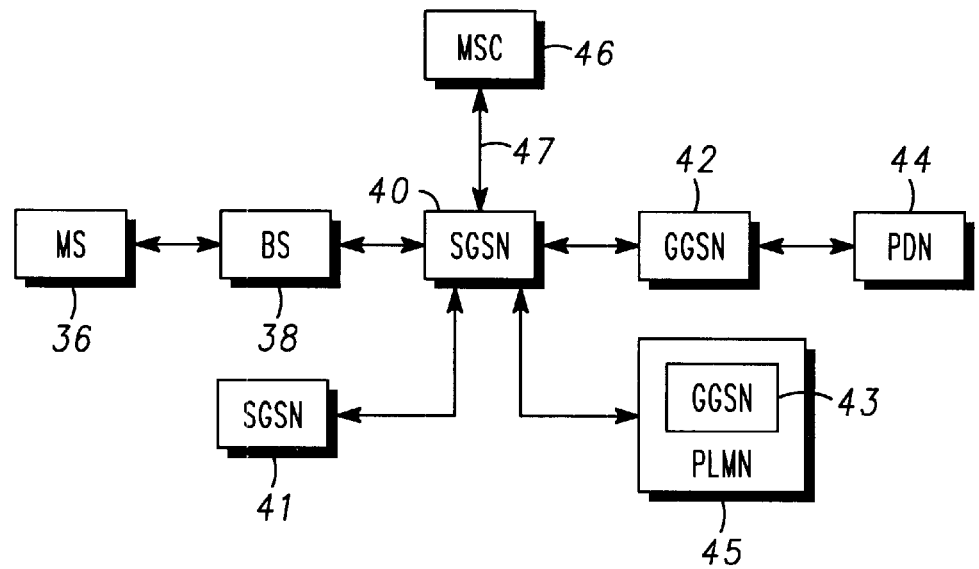
FIG. 2 is a schematic diagram of a signaling and data transfer interface, between a non-GSM mobile switching center and an SGSN of a GSM network, according to a preferred embodiment of the present invention.

FIG. 2 is a schematic diagram of a signaling and data transfer interface, between a non-GSM mobile switching center and an SGSN in a packet service based GSM network, according to a preferred embodiment of the present invention. As illustrated in FIG. 2, a packet based GSM network 34 includes a mobile station 36, a base station 38, a SGSN 40, and a GGSN 42 interconnected with a packet data network ("PDN") 44. The SGSN 40 may also be interconnected with another SGSN 41 or with a GGSN 43 from an alternate public land mobile network ("PLMN") 45. A mobile station switching center 46 that operates using non-GSM technology, such as TIA/EIA-136 technology for example, interfaces with the SGSN 40 through a gateway interface 47. According to the present invention, the gateway interface 47 is derived using a subset of the gateway interface 47 as defined by GSM technology, and adding procedures and messages for the tunneling of non-GSM signaling messages associated with the TLA/EIA-136 technology between the mobile station 36 and the mobile station switching center 46 through the SGSN 40.

It is understood that the mobile switching center 46 may interface with other mobile switching centers (not shown) to transmit signaling messages from the other mobile switching centers to the SGSN 40 through the gateway interface 47, or in the alternative, the other mobile switching centers may interface directly with the SGSN 40 through separate gateway interfaces connecting the mobile switching centers to the SGSN 40.

Figure 3:
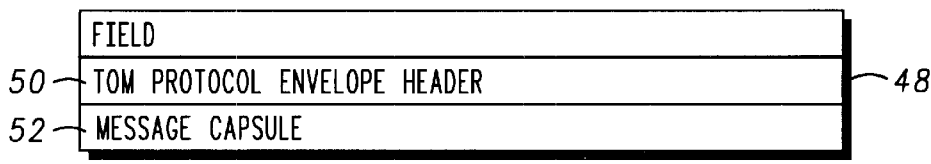
FIG. 3 is a table illustrating a format of a tunneling of messages protocol envelope according to the preferred embodiment of the present invention.

FIG. 3 is a table illustrating a format of a tunneling of messages protocol envelope according to a preferred embodiment of the present invention. The tunneling of the non-GSM signaling messages between the mobile station 36 and the mobile station switching center 46 through the SGSN 40 is accomplished, according to the present invention, using a combination of specific procedures at the mobile station 36, the mobile station switching center 46, and the SGSN 40. For example, as illustrated in FIGS. 2 and 3, when one or more non-GSM messages are to be communicated by the mobile station 36 to the mobile switching center 46, the mobile station 36 constructs a tunneling of messages ("TOM") protocol envelope 48 containing standardized information, including a protocol discriminator related to the non-GSM protocols associated with the technology of the mobile switching center 46, information specific to the protocol discriminator, along with the one or more non-GSM based messages. The TOM protocol envelope 48 is then sent by the mobile station 36 to the SGSN 40 along a logical link control layer service access point that is terminated at the SGSN 40.

As illustrated in FIG. 3, the TOM protocol envelope 48 constructed and sent by the mobile station 36 to the SGSN 40 includes a TOM protocol envelope header 50 and a message capsule 52. The message capsule 52 contains the one or more non-GSM signaling messages to be communicated by the mobile station 36 to the mobile switching center 46, and the TOM protocol envelope header 50 contains information necessary to route the message capsule 52.

Figure 4:
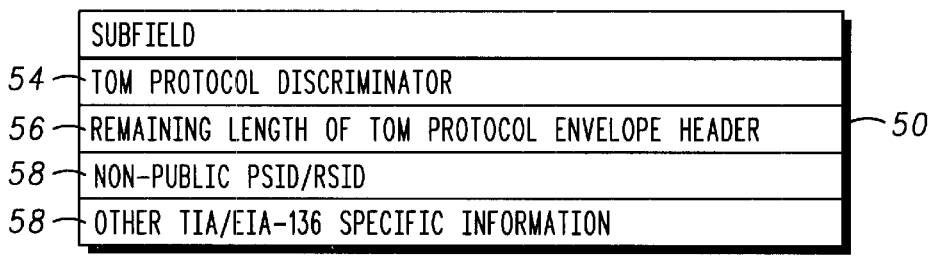
FIG. 4 is a table illustrating an uplink format for a tunneling of messages protocol envelope header according to the preferred embodiment of the present invention.

FIG. 4 is a table illustrating an uplink format for a tunneling of messages protocol envelope header according to the preferred embodiment of the present invention. As illustrated in FIG. 4, the TOM protocol envelope header 50 of the TOM protocol envelope 48 includes a TOM protocol discriminator subfield 54, a remaining length of TOM protocol envelope header subfield 56, and non-GSM technology protocol subfields 58 related to operation protocols of the non-GSM technology, i.e., the TIA/EIA-136 technology for example. The TOM protocol discriminator subfield 54 identifies the protocol using tunneling of messages, which in this case is the TIA/EIA-136 protocol, and the remaining length of the TOM protocol envelope header subfield 56 indicates the number of octets following the current octet in the TOM protocol discriminator subfield 54. The non-GSM technology protocol subfields 58 are specific to the type of non-GSM technology involved. For example, when TIA/EIA-136 technology is involved, the non-GSM technology protocol subfields 58 include a non-public private system identifier/residential system identifier ("PSID/RSID") subfield and a subfield containing other TIA/EIA-136 specific information.

Upon receiving the TOM protocol envelope 48 from the mobile station 36, the SGSN 40 determines the mobile switching center to which the message capsule 52 contained in the TOM protocol envelope 48 is to be forwarded. This determination is made by the SGSN 40 based on a protocol discriminator located in the TOM protocol discriminator subfield 54 of the TOM protocol envelope 48 received from the mobile station 36, information in the TOM protocol envelope 48 specific to the protocol discriminator, and a routing area identifier ("RAI") associated with the location of the mobile station 36 obtained by the SGSN 40 upon receipt of the TOM protocol envelope 48 from the mobile station 36. For example, when the non-GSM technology used involves the TIA/EIA-136 technology, the SGSN 40 determines the mobile switching center to receive the message capsule based on the RAI obtained upon receipt of the TOM protocol envelope 48 from the mobile station 36, a protocol discriminator indicating the TIA/EIA-136 protocol located in the TOM protocol discriminator subfield 54 of the TOM protocol envelope 48, and non-public PSID/RSID and other TIA/EIA-136 specific information contained in the non-GSM technology protocol subfields 58.

The SGSN 40 then constructs an UPLINK-TUNNEL-REQUEST message, including the identity of the mobile station that sent the TOM protocol envelope 48, an encryption status indicating whether the TOM protocol envelope 48 was received from the mobile station in an encrypted form, a priority of the message capsule 52, along with the message capsule 52. The SGSN 40 then forwards the constructed UPLINK-TUNNEL-REQUEST message to the message switching center determined by the SGSN 40 as receiving the message.

Upon receiving an UPLINK-TUNNEL-REQUEST message from the SGSN 40 containing the identity of the mobile station sending the message capsule 52, the encryption status indicating whether the TOM protocol envelope 48 was received from the identified mobile station in an encrypted format, the priority of the message capsule 52, and the message capsule 52, the mobile switching center 46 extracts the message capsule 52 from the UPLINK-TUNNEL-REQUEST message and processes the one or more non-GSM messages contained in the message capsule 52.

When one or more non-GSM messages are to be communicated by the mobile switching center 46 to the mobile station 36 that is located on the packet service based GSM network 34, and therefore can only be transmitted to the mobile station through the SGSN 40, the mobile switching center 46 constructs a DOWNLINK-TUNNEL REQUEST message with the message capsule 52 containing the one or more non-GSM messages. The DOWNLINK-TUNNEL REQUEST message includes an identity of the mobile station that is to receive the message capsule 52, an encryption request indicating whether the message capsule 52 is to be sent to the mobile station in an encrypted format, the priority of the message capsule 52, along with the message capsule 52. The mobile switching center 46 then sends the constructed DOWNLINK-TUNNEL REQUEST message to the SGSN 40 associated with the mobile station 36.

Upon receiving the DOWNLINK-TUNNEL REQUEST message from the mobile switching center 46, the SGSN 40 constructs a TOM protocol envelope containing the message capsule 52 received with the DOWNLINK-TUNNEL REQUEST message. The SGSN 40 sends the constructed TOM protocol envelope to the mobile station identified in the DOWNLINK-TUNNEL REQUEST message on an appropriate service access point of the logical link control layer. The appropriate logical link control layer service access point is selected by the SGSN 40 based on the priority of the message capsule 52 indicated in the DOWNLINK-TUNNEL REQUEST message transmitted by the mobile switching center 46. Logical link control layer encryption is enabled or disabled based on the encryption request information contained in the DOWNLINK-TUNNEL REQUEST message.

The TOM protocol envelope constructed by the SGSN 40 and sent by the SGSN 40 to the mobile station 36 is similar to the TOM protocol envelope 48 constructed by the mobile station 36 and illustrated in FIG. 3. The TOM protocol envelope constructed by the SGSN 40 includes the message capsule 52 containing the one or more non-GSM signaling messages to be communicated by the mobile switching center 46 to the mobile station 36, and the TOM protocol envelope header 50 containing information necessary to route the message capsule 52.

Figure 5:
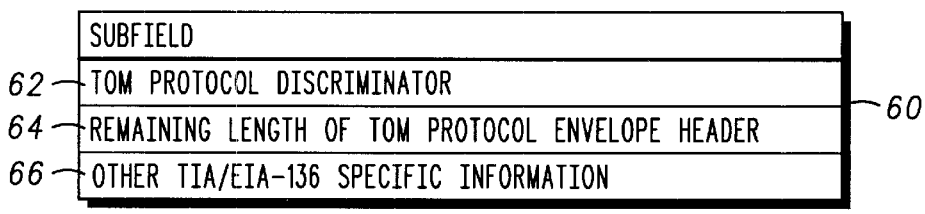
FIG. 5 is a table illustrating downlink format for a tunneling of messages protocol envelope header according to the preferred embodiment of the present invention.

FIG. 5 is a table illustrating a tunneling of messages protocol envelope header downlink format according to the preferred embodiment of the present invention. As illustrated in FIG. 5, a TOM protocol envelope header 60 constructed by the SGSN 40 and sent by the SGSN 40 to the mobile station 36 includes a TOM protocol discriminator subfield 62, a remaining length of TOM protocol envelope header subfield 64, and a non-GSM technology protocol subfields 66, containing information specific to the non-GSM technology, such information specific to TIA/EIA-136 technology, for example. The TOM protocol discriminator subfield 62 identifies the protocol using tunneling of messages, such as the TIA/EIA-136 protocol, and the remaining length of TOM protocol envelope header subfield 64 indicates the number of octets following the current octet in the TOM protocol discriminator subfield 62.

Upon receiving the TOM protocol envelope from the SGSN 40, a determination is made by the mobile station 36 as to whether the protocol identified by a protocol discriminator located in the TOM protocol discriminator subfield 62 is supported by the mobile station 36. If the identified protocol is supported by the mobile station 36, the mobile station 36 extracts the one or more messages in the message capsule 52 from the TOM protocol envelope 48 and processes the extracted one or more messages.

Figure 6:
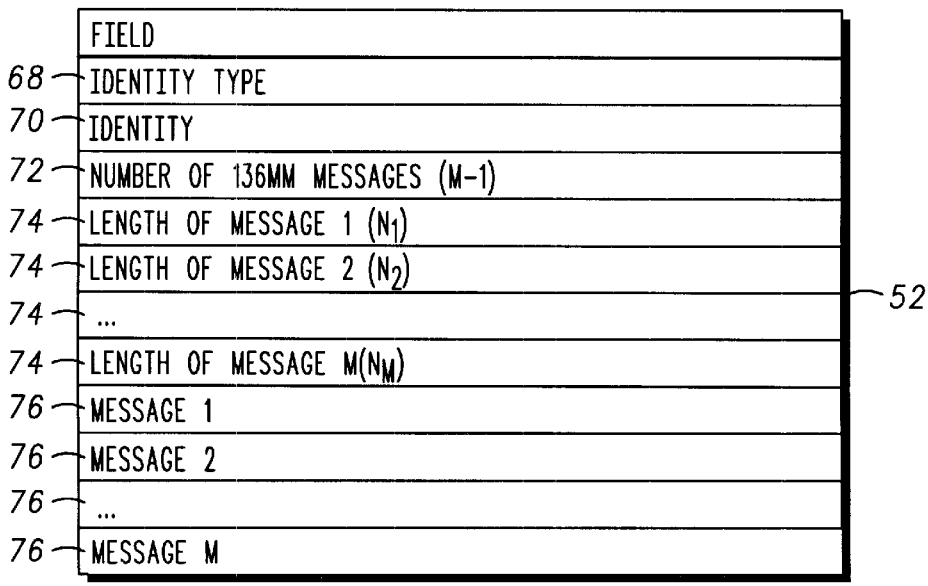
FIG. 6 is a table illustrating encapsulation of a non-GSM signaling message.

FIG. 6 is a table illustrating encapsulation of a non-GSM signaling message. Encapsulation of the one or more messages in the message capsule 52 is specific to the non-GSM technology involved. For example, as illustrated in FIG. 6, when TIA/EIA-136 technology is involved, the message capsule 52 includes an identity type field 68 that identifies whether a mobile station identifier ("MSID") is present in the message capsule 52, and if present, identifies the type of mobile station identifier, and an identity field 70 in which the mobile station identifier is contained. Since the TIA/EIA-136 technology allows the message capsule 52 to contain one or more messages, a number of messages field 72 indicates the number of messages in the message capsule 52, and the total number of messages is one more than the value of the number of messages field 72 (M-1). Length of messages fields 74 indicate the number of octets in each message, $N_1$ to $N_M$, and message fields 76 provide octets belonging to a given message, and are padded with trailing zeros to the nearest octet boundary.

In this way, by using the TOM protocol envelope 48 of the present invention, tunneling of the non-GSM signaling messages between the mobile station 36 and the mobile station switching center 46 through the SGSN 40 is accomplished using a combination of specific procedures at the mobile station 36, the mobile station switching center 46, and the SGSN 40 that are specific to information contained in the non-GSM technology. As a result, the present invention minimizes necessary changes to the SGSN 22 and the non-GSM mobile switching center, while enabling deployment of a wide variety of signaling and non-signaling message exchanges between the mobile station 26 and the mobile switching center 30, while having minimal effect upon the operation of the SGSN 22.

It is understood that while a particular embodiment of the present invention has been shown and described, modifications may be made. For example, while the present invention has been shown and described as including TIA/EIA-136 technology as the non-GSM technology employed, the present invention may be realized using non-GSM technology other than the TIA/EIA-136 technology which is intended to utilize GSM GPRS network elements to support packet data. It is therefore intended in the appended claims to cover all such changes and modifications which fall within the true spirit and scope of the invention.

What is claimed is:

1. A method of tunneling a message capsule, containing one or more non-GSM signaling messages, from a mobile station of a non-GSM network that uses a GSM serving GPRS support node and a gateway GPRS support node to provide packet service to a one mobile switching center of a plurality of mobile switching centers that operate using non-GSM protocols, comprising the steps of:

constructing a tunneling of messages protocol envelope, at the mobile station, including the message capsule and information specific to the non-GSM protocols;

transmitting the tunneling of messages protocol envelope to the serving GPRS support node;

determining, at the serving GPRS support node, that the one mobile switching center is to receive the message capsule based on a routing area identifier corresponding to the mobile station and the information specific to the non-GSM protocols; and transmitting the message capsule to the one mobile switching center.

2. The method of claim 1, wherein the tunneling of messages protocol envelope includes a tunneling of messages protocol envelope header containing information necessary to route the message capsule.

3. The method of claim 2, wherein the tunneling of messages protocol envelope header includes a tunneling of messages protocol discriminator subfield that identifies the non-GSM protocols.

4. The method of claim 3, wherein the tunneling of messages protocol envelope header includes a remaining length of tunneling of messages protocol envelope header subfield that indicates a number of octets following a current octet in the tunneling of messages protocol discriminator subfield, and non-GSM protocol subfields corresponding to the non-GSM protocols.

5. The method of claim 4, wherein the non-GSM protocols are TIA/EIA-136 protocols.

6. The method of claim 5, wherein the non-GSM protocol subfields include a non-public private system identifier/residential system identifier subfield and a subfield containing other TLA/EIA-136 specific information.

7. The method of claim 6, wherein the message capsule comprises:

an identity type field to identify whether a mobile station identifier is present in the message capsule, and a type of mobile station identifier in response to the mobile station identifier being present;

an identity field containing the mobile station identifier;

number of messages field indicating a total number of the one or more messages in the message capsule;

a length of messages field to indicate a number of octets in each of the one or more messages; and message fields to provide octets for the one or more messages.

8. A method of tunneling a message capsule containing one or more non-GSM signaling messages from a non-GSM mobile switching center that operates using non-GSM protocols to a mobile station of a non-GSM network, that uses a GSM serving GPRS support node and a gateway GPRS support node to provide packet service, comprising the steps of:

transmitting the message capsule and a mobile station identifier corresponding to the mobile station from the mobile switching center to the serving GPRS support node;

constructing, at the serving GPRS support node, a tunneling of messages protocol envelope including the message capsule and information specific to the non-GSM protocols; and transmitting the tunneling of messages protocol envelope to the mobile station based on the mobile station identifier.

9. The method of claim 8, wherein the tunneling of messages protocol envelope includes a tunneling of messages protocol envelope header containing information necessary to route the message capsule.

10. The method of claim 9, wherein the tunneling of messages protocol envelope header includes a tunneling of messages protocol discriminator subfield that identifies the non-GSM protocols.

11. The method of claim 10, wherein the tunneling of messages protocol envelope header includes a remaining length of tunneling of messages protocol envelope header subfield that indicates a number of octets following a current octet in the tunneling of messages protocol discriminator subfield and a non-GSM protocol subfield corresponding to the non-GSM protocols.

12. The method of claim 11, wherein the non-GSM protocols are TIA/EIA-136 protocols.

13. The method of claim 12, wherein the non-GSM protocol subfield contains other TIA/EIA specific information.

14. The method of claim 13, wherein the message capsule comprises:
- an identity type field to identify whether a mobile station identifier is present in the message capsule and a type of mobile station identifier in response to the mobile station identifier being present;
- an identity field containing the mobile station identifier;
- a number of messages field indicating a total number of the one or more messages in the message capsule;
- a length of messages field to indicate a number of octets in each of the one or more messages; and
- message fields to provide octets for the one or more messages.

15. A method of tunneling signaling messages between a mobile station of a non-GSM network that uses a GSM serving GPRS support node and a gateway GPRS support node to provide packet service, and a plurality of mobile switching centers that operates using non-GSM protocols, comprising the steps of:
- constructing an uplink tunneling of messages protocol envelope, at the mobile station, including an uplink message capsule containing one or more non-GSM signaling messages and information specific to the non-GSM protocols;
- transmitting the uplink tunneling of messages protocol envelope to the serving GPRS support node;
- determining, at the serving GPRS support node, that a one mobile switching center of the plurality of mobile switching centers is to receive the uplink message capsule based on a routing area identifier corresponding to the mobile station and the information specific to the non-GSM protocols and transmitting the uplink message capsule to the mobile switching center;
- transmitting a downlink message capsule, containing one or more non-GSM signaling messages, and an identity of the mobile station, from the mobile switching center to the serving GPRS support node;
- constructing, at the serving GPRS support node, a downlink tunneling of messages protocol envelope including the downlink message capsule and information specific to the non-GSM protocols and transmitting the downlink tunneling of messages protocol envelope to the mobile station; and
- determining, at the mobile station, whether the non-GSM protocols are supported by the mobile station based on the information specific to the non-GSM protocols contained in the downlink tunneling of messages protocol envelope.

16. The method of claim 15, wherein the uplink tunneling of messages protocol envelope and the downlink tunneling of messages protocol envelope include a tunneling of messages protocol envelope header containing information necessary to route the respective message capsule, a tunneling of messages protocol discriminator subfield that identifies the non-GSM protocols, a remaining length of tunneling of messages protocol envelope header subfield that indicates a number of octets following a current octet in the tunneling of messages protocol discriminator subfield, and a non-GSM protocol subfield corresponding to the non-GSM protocols.

17. The method of claim 16, wherein the non-GSM protocols are TIA/EIA-136 protocols.

18. The method of claim 17, wherein the non-GSM protocol subfields of the uplink tunneling of messages protocol envelope include a non-public private system identifier/residential system identifier subfield and a subfield containing other TIA/EIA-136 specific information, and the non-GSM protocol subfield of the downlink tunneling of messages protocol envelope contains TLA/EIA-136 specific information.

19. The method of claim 18, wherein the uplink message capsule and the downlink message capsule comprise:
- an identity type field to identify whether a mobile station identifier is present in the message capsule and a type of mobile station identifier in response to the mobile station identifier being present;
- an identity field containing the mobile station identifier;
- a number of messages field indicating a total number of the one or more messages in the message capsule;
- a length of messages field to indicate a number of octets in each of the one or more messages; and
- message fields to provide octets for the one or more messages.

20. A non-GSM network that uses a GSM serving GPRS support node and a gateway GPRS support node to provide packet service, comprising:
- a mobile station to transmit an uplink tunneling of messages protocol envelope to the serving GPRS support node, the uplink tunneling of message protocol envelope including an uplink message capsule, containing one or more signaling messages constructed using non-GSM protocols, and information specific to the non-GSM protocols; and
- a mobile switching center that operates using non-GSM protocols to transmit a DOWNLINK-TUNNEL REQUEST message to the serving GPRS support node that includes a downlink message capsule, containing one or more signaling messages constructed using the non-GSM protocols, and a mobile station identifier, wherein the serving GPRS support node determines a destination of the uplink message capsule based on the information specific to the non-GSM protocols in response to receiving the uplink tunneling of messages protocol envelope, and wherein the serving GPRS support node constructs a downlink tunneling of messages protocol envelope, including the downlink message capsule and information specific to the non-GSM protocols, in response to receiving the downlink message capsule and the mobile station identifier, and transmits the downlink tunneling of information protocol envelope based on the mobile station identifier.

21. The non-GSM network of claim 20, wherein the uplink tunneling of messages protocol envelope and the downlink tunneling of messages protocol envelope include a tunneling of messages protocol envelope header containing information necessary to route the corresponding first and second message capsule, a tunneling of messages protocol discriminator subfield that identifies the non-GSM protocols, a remaining length of tunneling of messages protocol envelope header subfield that indicates a number of octets following a current octet in the tunneling of messages protocol discriminator subfield, and a non-GSM protocol subfield corresponding to the non-GSM protocols.

22. The non-GSM network of claim 21 wherein the non-GSM protocols are TIA/EIA-136 protocols.

23. The non-GSM network of claim 22, wherein the non-GSM protocol subfields of the uplink tunneling of messages protocol envelope include a non-public private system identifier/residential system identifier subfield and a subfield containing other TIA/EIA-136 specific information, and the non-GSM protocol subfield of the downlink tunneling of messages protocol envelope contains TIA/EIA-136 specific information.

24. The non-GSM network of claim 23, wherein the uplink message capsule and the downlink message capsule further comprising:

an identity type field to identify whether a mobile station identifier is present in the respective first and second message capsules and a type of mobile station identifier in response to the mobile station identifier being present;

an identity field containing the mobile station identifier;

a number of messages field indicating a total number of the one or more messages in the message capsule;

a length of messages field to indicate a number of octets in each of the one or more messages; and message fields to provide octets for the one or more messages.

* * * * *